United States Patent
Silverbrook et al.

(10) Patent No.: US 7,173,739 B2
(45) Date of Patent: *Feb. 6, 2007

(54) PAGEWIDTH INKJET PRINTER HAVING COMPOSITE IMAGE PRINTING CONTROL

(75) Inventors: Kia Silverbrook, Balmain (AU); Paul Lapstun, Balmain (AU); Simon Robert Walmsley, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 25 days.

This patent is subject to a terminal disclaimer.

(21) Appl. No.: 11/123,011

(22) Filed: May 6, 2005

(65) Prior Publication Data

US 2005/0200864 A1 Sep. 15, 2005

Related U.S. Application Data

(63) Continuation of application No. 10/189,459, filed on Jul. 8, 2002, now Pat. No. 6,921,144, which is a continuation of application No. 09/575,108, filed on May 23, 2000, now Pat. No. 6,795,215.

(51) Int. Cl.
*H04N 1/40* (2006.01)
*H04N 1/405* (2006.01)
*B41J 2/01* (2006.01)
*B41J 2/205* (2006.01)

(52) U.S. Cl. ............... 358/2.1; 358/2.99; 358/3.06; 358/450; 358/462; 347/15

(58) Field of Classification Search ........ 358/1.9–3.01, 358/1.2, 3.06, 3.24, 462, 502, 534, 539, 450; 347/15; 382/233

See application file for complete search history.

(56) References Cited

U.S. PATENT DOCUMENTS

| | | | |
|---|---|---|---|
| 4,931,860 A | 6/1990 | Narumiya | |
| 5,301,271 A * | 4/1994 | Hiratsuka et al. | 345/536 |
| 5,634,089 A | 5/1997 | Kulbida et al. | |
| 5,758,042 A | 5/1998 | Deschuytere | |
| 5,805,178 A | 9/1998 | Silverbrook | |
| 5,909,227 A | 6/1999 | Silverbrook | |
| 5,914,737 A | 6/1999 | Silverbrook | |
| 6,020,978 A | 2/2000 | Cooper et al. | |
| 6,603,864 B1 | 8/2003 | Matsunoshita | |

FOREIGN PATENT DOCUMENTS

| | | |
|---|---|---|
| JP | 2000350003 A | 12/2000 |
| WO | WO 00/27640 A1 | 5/2000 |
| WO | WO 01/89838 A | 11/2001 |
| WO | WO 01/89850 A | 11/2001 |

* cited by examiner

*Primary Examiner*—Scott A. Rogers

(57) ABSTRACT

A printer is provided comprising a pagewidth inkjet printhead for printing bi-level dots of ink onto print media at a resolution of 800 to 1600 dpi and a controller for controlling the pagewidth inkjet printhead. The controller comprises a receiver for receiving compressed page data to be printed by the printhead, a first decoder configured to decode any compressed continuous tone image planes in the received compressed page data at a resolution of up to 320 ppi in each plane, a second decoder configured to decode any compressed bi-level image planes in the received compressed page data at a resolution of 320 to 1600 dpi in each plane, a half-toner/compositor for creating a composite image by halftoning the decoded continuous tone image planes and compositing the decoded bi-level image planes over the halftoned continuous tone image planes, and a printhead driver arranged to output the composite image to the printhead.

10 Claims, 11 Drawing Sheets

PAGEWIDTH INKJET PRINTER HAVING COMPOSITE IMAGE PRINTING CONTROL

CROSS REFERENCE TO RELATED APPLICATION

The present application is a Continuation of U.S. application Ser. No. 10/189,459, filed on Jul. 8, 2002, now U.S. Pat. No. 6,921,144 which is a Continuation of U.S. application Ser. No. 09/575,108 filed on May 23, 2000, now granted U.S. Pat. No. 6,795,215, the entire contents of which are herein incorporated by reference.

FIELD OF THE INVENTION

The invention relates to a print engine/controller (PEC) suitable for use with a range of printer products. The invention further relates to a print engine/controller implemented in a print head interface chip.

BACKGROUND OF THE INVENTION

A range of printer types have evolved wherein an image is constructed from ink selectively applied to a page in dot format. In U.S. Pat. No. 6,045,710 titled 'Self-aligned construction and manufacturing process for monolithic print heads' to the inventor Kia Silverbrook there is set out an assessment of the prior art to drop on demand printers along with its manufacturing process.

A microelectomechanical drop on demand print head hereafter referred to as a Memjet print head has been described in co-pending United States Patent Applications filed simultaneously to the present application and hereby incorporated by cross reference:

| USSN | Our Docket Number | Our Title |
|---|---|---|
| 09/575,152 | MJ62US | Fluidic seal for an ink jet nozzle assembly |
| 09/575,141 | IJ52US | Ink jet print head having a moving nozzle with an externally arranged actuator |
| 09/575,125 | IJM52US | Method of manufacture of an ink jet print head having a moving nozzle with an externally arranged actuator |
| 09/575,176 | MJ63US | Ink jet print head nozzle array |
| 09/575,147 | MJ58 | Nozzle guard for an ink jet print head |

The Memjet print head is developed from print head segments that are capable of producing, for example, 1600 dpi bi-level dots of liquid ink across the full width of a page. Dots are easily produced in isolation, allowing dispersed-dot dithering to be exploited to its fullest. Color planes might be printed in perfect registration, allowing ideal dot-on-dot printing. The print head enables high-speed printing using microelectromechanical ink drop technology.

Various methods, systems and apparatus relating to a printed page based communications network that is best worked with high-speed page printing has been disclosed in co-pending United States Patent Applications/Granted Patents filed by the applicant or assignee of the present invention and are hereby incorporated by cross reference:

| | | |
|---|---|---|
| 09/575,197 (NPA001US), | 09/575,195 (NPA002US), | 09/575,159 (NPA004US), |
| 09/575,132 (NPA005US), | 09/575,123 (NPA006US), | 6,825,945 (NPA007US), |
| 09/575,130 (NPA008US), | 09/575,165 (NPA009US), | 09/575,153 (NPA010US), |
| 09/575,118 (NPA012US), | 09/575,131 (NPA016US), | 09/575,116 (NPA017US) |
| 6,816,274 (NPA018US), | 09/575,139 (NPA019US), | 09/575,186 (NPA020US), |
| 6,681,045 (NPA021US), | 6,728,000 (NPA030US), | 09/575,145 (NPA035US), |
| 09/575,192 (NPA048US), | 09/575,181 (NPA075US), | 09/575,193 (NPB001US), |
| 09/575,156 (NPB002US), | 09/575,183 (NPK002US), | 6,789,194 (NPK003US), |
| 09/575,150 (NPK004US), | 6,789,191 (NPK005US), | 6,644,642 (NPM001US), |
| 6,502,614 (NPM002US), | 6,622,999 (NPM003US), | 6,669,385 (NPM004US), |
| 6,549,935 (NPN001US), | 6,591,884 (NPP005US), | 6,439,706 (NPP006US), |
| 09/575,187 (NPP001US), | 6,727,996 (NPP003US), | 6,760,119 (NPP007US), |
| 09/575,198 (NPP008US), | 6,290,349 (NPP016US), | 6,428,155 (NPP017US), |
| 6,785,016 (NPP018US), | 09/575,174 (NPS001US), | 6,822,639 (NPS003US), |
| 6,737,591 (NPS020US), | 09/575,154 (NPT001US), | 09/575,129 (NPT002US), |
| 6,830,196 (NPT003US), | 09/575,188 (NPT004US), | 09/575,189 (NPX001US), |
| 09/575,162 (NPX003US), | 09/575,172 (NPX008US), | 09/575,170 (NPX011US), |
| 09/575,171 (NPX014US), | 09/575,161 (NPX016US), | 6,428,133 (IJ52US), |
| 6,526,658 (IJM52US), | 6,315,699 (MJ10US), | 6,338,548 (MJ11US), |
| 6,540,319 (MJ12US), | 6,328,431 (MJ13US), | 6,328,425 (MJ14US), |
| 09/575,127 (MJ15US), | 6,383,833 (MJ34US), | 6,464,332 (MJ47US), |
| 6,439,693 (MJ52) | 6,390,591 (MJ58US), | 09/575,152 (MJ62US), |
| 6,328,417 (MJ63US), | 6,409,323 (PAK04US), | 6,281,912 (PAK05US), |
| 6,604,810 (PAK06US), | 6,318,920 (PAK07US), | 6,488,422 (PAK08US), |
| 6,795,215 (PEC01US), | 09/575,109 (PEC02US), | 09/575,110 (PEC03US), |

The disclosures of these co-pending applications are incorporated herein by reference.

Performance of a print head such as the above is dictated by its engine/controller. High-speed printing is a matter of development of both the print head and its engine/controller. A page wide print head enabled by the above technology needs an engine/controller capable of feeding it high rates of drop control signals. A typical page layout may contain a mixture of images, graphics and text. Because of the page-width nature of the above microelectromechanical print head, each page can be printed at a constant speed to avoid creating visible artifacts. This means that the printing speed need not be varied to match the input data rate. Document rasterization and document printing can be decoupled. To ensure the print head has a constant supply of data, a page should not be printed until it is fully rasterized. Ideally rasterization should be able to run ahead of the printer when rasterizing simple pages, buying time to rasterize more complex pages. The engine/controller determines the degree to which these functions might be realised.

More speed at the print head depends on development of both print head and its engine/controller. The print engine/controller architecture needs to be designed to push large volumes of data to the print head at high speed.

SUMMARY OF THE INVENTION

In one form the invention resides in a print engine/controller comprising:
 a contone image decoder;
 a bi-level compression decoder; and a half-toner/compositor and print head interface.

The print engine/controller provides the final steps for producing a page from compressed page data appropriately formatted for it by a computer or print distribution system, the steps being: expanding the page image, dithering the contone layer, compositing the black layer over the contone layer, adding infrared tags to the infrared layer, and sending the resultant image to the print head.

The print engine/controller preferably uses a high speed serial interface at which to receive compressed page data. Contone image planes are decoded by a JPEG decoder and they are scaled in the halftoner/compositor under control of a margin unit. A Group 4 facsimile decoder decodes the bi-level image plane and it also is scaled in the halftoner/compositor under control of the margin unit. Optionally an infrared tag encoder serves to produce an infrared image plane to place infrared ink printed tags into a printed page. The halftoner/compositor includes a dither matrix access unit to supply dither data from the compressed page data by which to dither the contone image plane.

The invention further includes a print engine/controller chip to interface with an ink drop print head comprising an interface at which to receive compressed page data, a contone image decoder to decode any continuous tone image planes in the received compressed page data, a bi-level decoder to decode any bi-level image planes and dither data in the received compressed page data, a half-toner/compositor to composite any bi-level image plane over any continuous tone image plane, and a print head driver to output the composite to a print head.

DETAILED DESCRIPTION OF THE PREFERRED EMBODIMENTS

A typically 12 inch print head width is controlled by one or more PECs, as described below, to allow full-bleed printing of both A4 and Letter pages. Six channels of colored ink are the expected maximum in the present printing environment, these being:

CMY, for regular color printing.
K, for black text and other black printing.
IR (infrared), for tag-enabled applications.
F (fixative), to enable printing at high speed.

Because the printer is to be capable of fast printing, a fixative will be required to enable the ink to dry before the next page has completed printing at higher speeds. Otherwise the pages might bleed on each other. In lower speed printing environments the fixative will not be required.

A PEC might be built in a single chip to interface with a print head. It will contain four basic levels of functionality:
receiving compressed pages via a serial interface such as IEEE 1394
a print engine for producing a page from a compressed form. The print engine functionality includes expanding the page image, dithering the contone layer, compositing the black layer over the contone layer, optionally adding infrared tags, and sending the resultant image to the print head.
a print controller for controlling the print head and stepper motors.
two standard low-speed serial ports for communication with the two QA chips. Note that there must be two ports and not a single port to ensure strong security during the authentication procedure.

Figure 1:
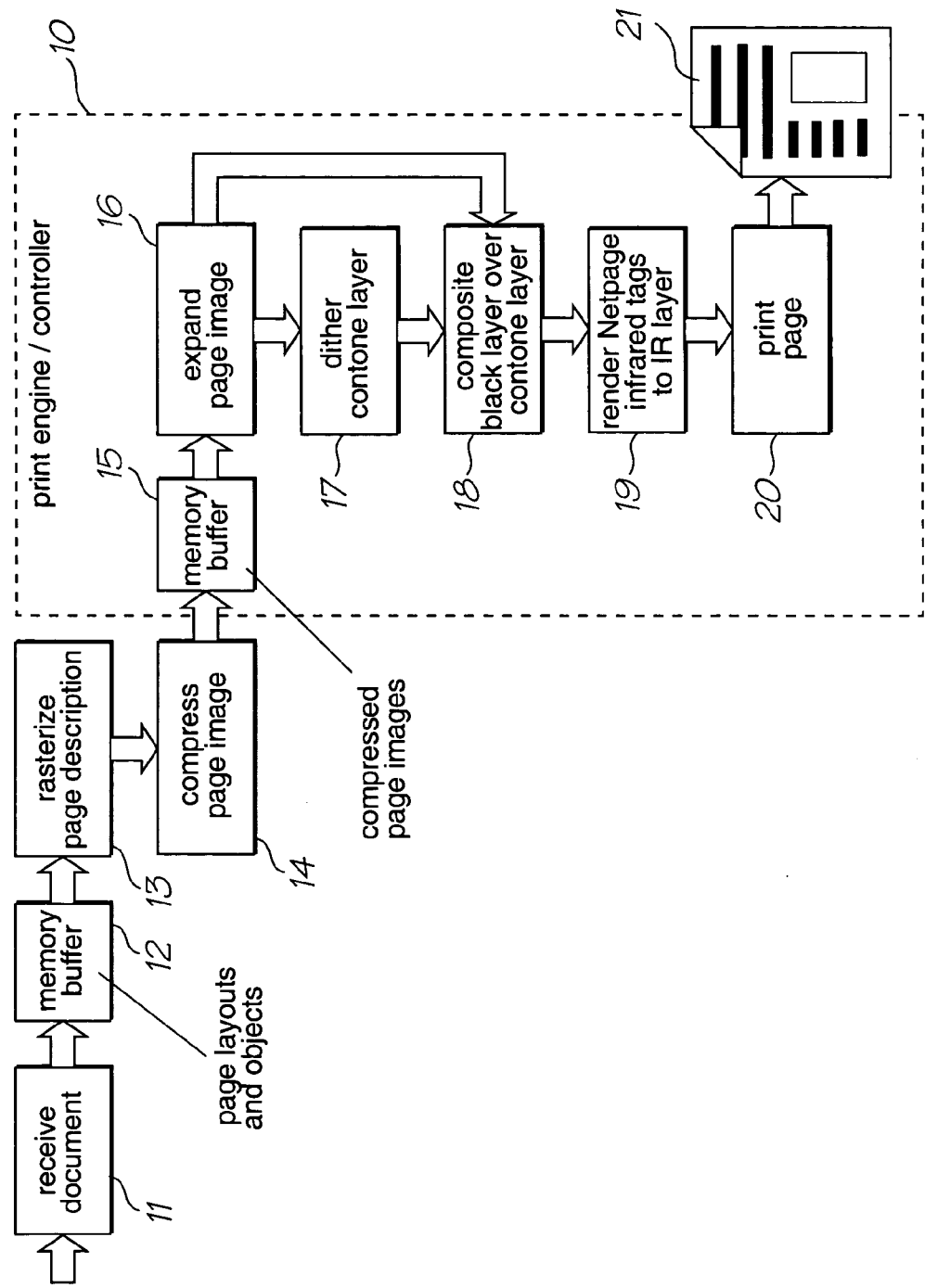
FIG. 1 is a diagram illustrating data flow and the functions performed by the print engine controller.

In FIG. 1 is seen the flow of data to send a document from computer system to printed page. A document is received at 11 and loaded to memory buffer 12 wherein page layouts may be effected and any required objects might be added. Pages from memory 12 are rasterized at 13 and compressed at 14 prior to transmission to the print engine controller 10. Pages are received as compressed page images within the print engine controller 10 into a memory buffer 15, from which they are fed to a page expander 16 wherein page images are retrieved. Any requisite dithering might be applied to any contone layer at 17. Any black bi-level layer might be composited over the contone layer at 18 together with any infrared tags at 19. The composited page data is printed at 20 to produce page 21.

The print engine/controller takes the compressed page image and starts the page expansion and printing in pipeline fashion. Page expansion and printing is preferably pipelined because it is impractical to store a sizable bi-level CMYK+IR page image in memory.

The first stage of the pipeline expands a JPEG-compressed contone CMYK layer (see below), expands a Group 4 Fax-compressed bi-level dither matrix selection map (see below), and expands a Group 4 Fax-compressed bi-level black layer (see below), all in parallel. In parallel with this, the tag encoder encodes bi-level IR tag data from the compressed page image. The second stage dithers the contone CMYK layer using a dither matrix selected by the dither matrix select map, composites the bi-level black layer over the resulting bi-level K layer and adds the IR layer to the page. A fixative layer is also generated at each dot position wherever there is a need in any of C, M, Y, K, or IR channels. The last stage prints the bi-level CMYK+IR data through the print head via a print head interface (see below).

Figure 2:
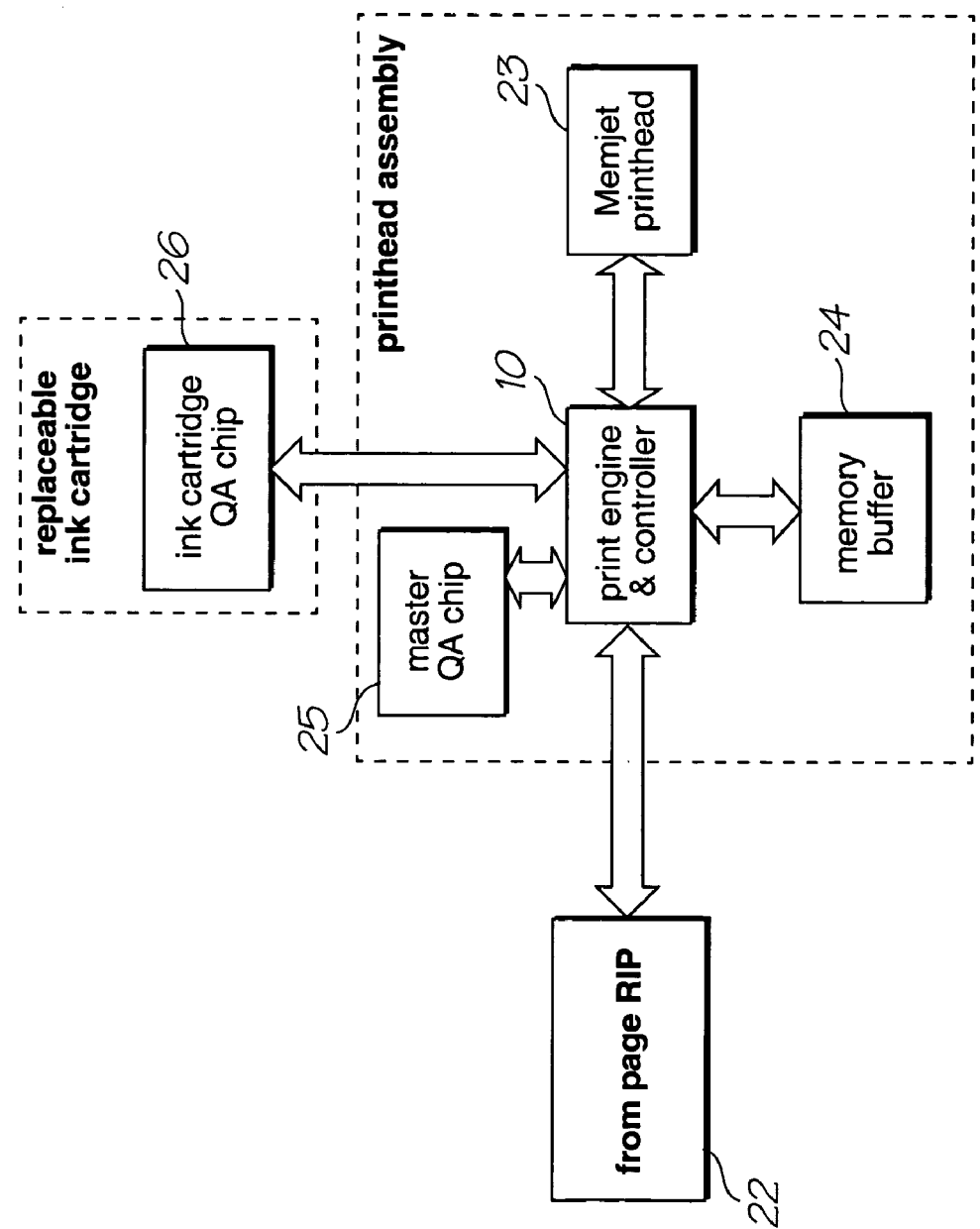
FIG. 2 shows the print engine controller in the context of the overall printer system architecture.

In FIG. 2 is seen how the print engine/controller 10 fits within the overall printer system architecture. The various components of the printer system might include

- a Print Engine/Controller (PEC). A PEC chip 10, or chips, is responsible for receiving the compressed page images for storage in a memory buffer 24, performing the page expansion, black layer compositing and sending the dot data to the print head 23. It may also communicate with QA chips 25,26 and provides a means of retrieving print head characteristics to ensure optimum printing. The PEC is the subject of this specification.
- a memory buffer. The memory buffer 24 is for storing the compressed page image and for scratch use during the printing of a given page. The construction and working of memory buffers is known to those skilled in the art and a range of standard chips and techniques for their use might be utilized in use of the PEC of the invention.
- a master QA chip. The master chip 25 is matched to replaceable ink cartridge QA chips 26. The construction and working of QA units is known to those skilled in the art and a range of known QA processes might be utilized in use of the PEC of the invention. For example, a QA chip is described in co-pending United States Patent Applications:

| USSN | Our Docket Number | Our Title |
|---|---|---|
| 09/517,539 | AUTH01 | Validation Protocol and System |
| 09/112,763 | AUTH02 | Circuit for Protecting Chips Against IDD Fluctuation Attacks |
| 09/112,737 | AUTH04 | Method for Protecting On-Chip Memory (Flash and RAM) |
| 09/112,761 | AUTH05 | Method for Making a Chip Tamper-Resistant |
| 09/113,223 | AUTH06 | A system for authenticating physical objects |
| 09/517,384 | AUTH07 | Validation Protocol and System |
| 09/505,951 | AUTH08 | Validation Protocol and System |
| 09/505,003 | AUTH09 | Consumable Authentication Protocol and System |
| 09/517,608 | AUTH10 | Consumable Authentication Protocol and System |
| 09/505,147 | AUTH11 | Consumable Authentication Protocol and System |
| 09/505,952 | AUTH12 | Unauthorized Modification of Values Stored in Flash Memory |
| 09/517,380 | AUTH13 | A System for the Manipulation of Secure Data |
| 09/516,874 | AUTH14 | An Authentication Chip with Protection from Power Supply Attacks |
| 09/517,541 | AUTH15 | Shielding Manipulations of Secret Data |

QA chip communication may be best included within the overall functionality of the PEC chip since it has a role in the expansion of the image as well as running the physical print head. By locating QA chip communication there it can be ensured that there is enough ink to print the page. Preferably the QA embedded in the print head assembly is implemented using an authentication chip. Since it is a master QA chip, it only contains authentication keys, and does not contain user-data. However, it must match the ink cartridge's QA chip. The QA chip in the ink cartridge contains information required for maintaining the best possible print quality, and is implemented using an authentication chip.

Preferably a 64 MBit (8 MByte) memory buffer is used to store the compressed page image. While one page is being written to the buffer another is being read (double buffering). In addition, the PEC uses the memory to buffer the calculated dot information during the printing of a page. During the printing of page N, the buffer is used for:

Reading compressed page N
Reading and writing the bi-level dot information for page N
Writing compressed page N+1

Preferably a PEC chip will incorporate a simple microcontroller CPU core 35 to perform the following functions:

perform QA chip authentication protocols via serial interface 36 between print pages
run the stepper motor via a parallel interface 91 during a print (the stepper motor requires a 5 KHz process)
synchronize the various portions of the PEC chip during a print
provide a means of interfacing with external data requests (programming registers etc.)
provide a means of interfacing with print head segment low-speed data requests (such as reading the characterization vectors and writing pulse profiles)
provide a means of writing the portrait and landscape tag structures to external DRAM Since all of the image processing is performed by dedicated hardware, the CPU does not have to process pixels. As a result, the CPU can be extremely simple. A wide variety of CPU known cores are suitable: it can be any processor core with sufficient processing power to perform the required calculations and control functions fast enough. An example of a suitable core is a Philips 8051 micro-controller running at about 1 MHz. Associated with the CPU core 35 may be a program ROM and a small program scratch RAM. The CPU communicates with the other units within the PEC chip via memory-mapped I/O. Particular address ranges may map to particular units, and within each range, to particular registers within that particular unit. This includes the serial 36 and parallel 91 interfaces. A small program flash ROM may be incorporated into the PEC chip. Its size depends on the CPU chosen, but should not be more than 8 KB. Likewise, a small scratch RAM area can be incorporated into the PEC chip. Since the program code does not have to manipulate images, there is no need for a large scratch area. The RAM size depends on the CPU chosen (e.g. stack mechanisms, subroutine calling conventions, register sizes etc.), but should not be more than about 2 KB.

A PEC chip using the above referenced segment based page wide print head can reproduce black at a full dot resolution (typically 1600 dpi), but reproduces contone color at a somewhat lower resolution using halftoning. The page description is therefore divided into a black bi-level layer and a contone layer. The black bi-level layer is defined to composite over the contone layer. The black bi-level layer consists of a bitmap containing a 1-bit opacity for each pixel. This black layer matte has a resolution that is an integer factor of the printer's dot resolution. The highest supported resolution is 1600 dpi, i.e. the printer's full dot resolution. The contone layer consists of a bitmap containing a 32-bit CMYK color for each pixel, where K is optional. This contone image has a resolution that is an integer factor of the printer's dot resolution. The highest supported resolution is 320 ppi over 12 inches for a single PEC, i.e. one-fifth the printer's dot resolution. For higher contone resolutions multiple PECs are required, with each PEC producing an strip of the output page. The contone resolution is also typically an integer factor of the black bi-level resolution, to simplify calculations in the RIPs. This is not a requirement, however. The black bi-level layer and the contone layer are both in compressed form for efficient storage in the printer's internal memory.

Figure 3:
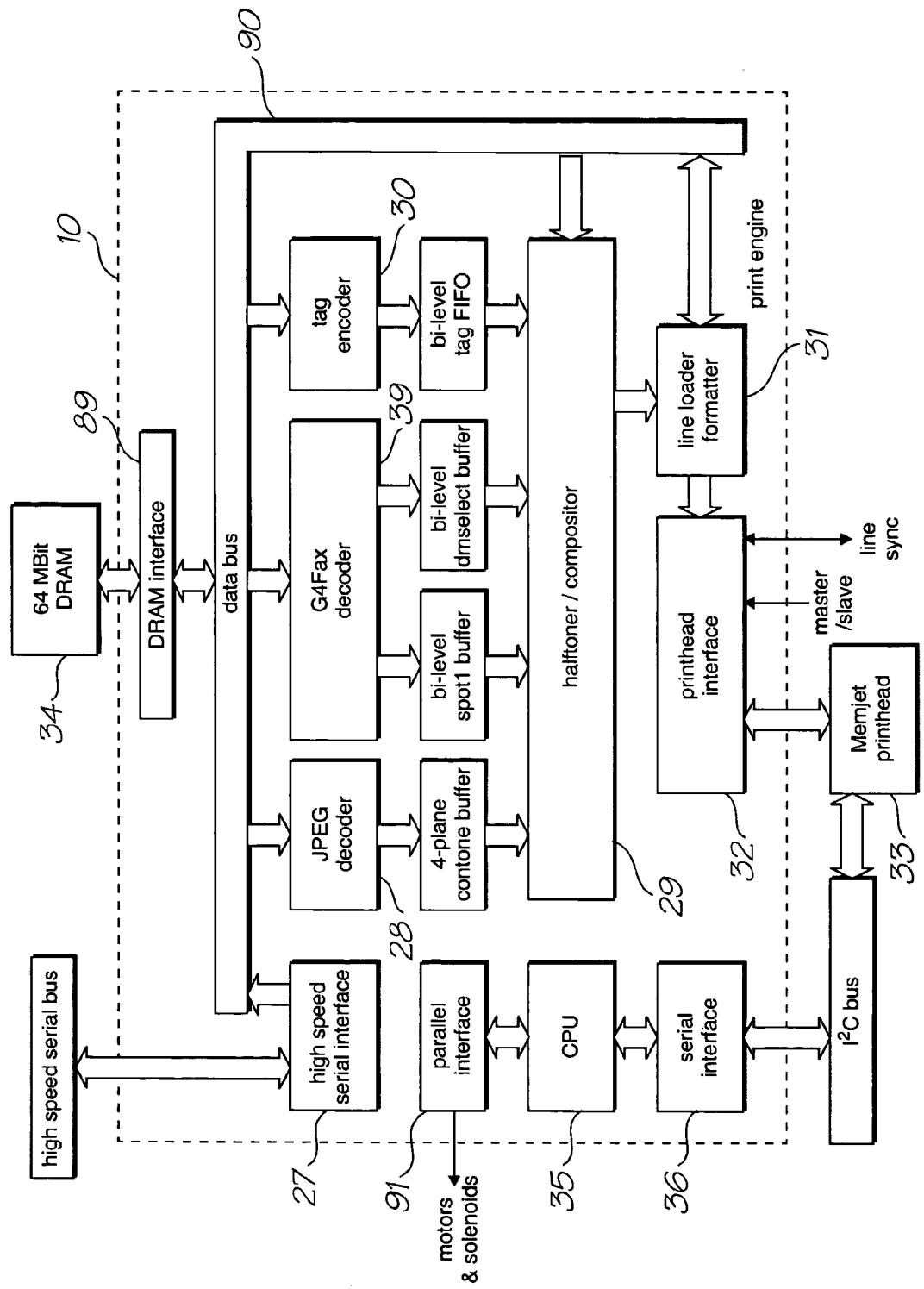
FIG. 3 illustrates the print engine controller architecture.

In FIG. 3 is seen the print engine architecture. The print engine's page expansion and printing pipeline consists of a high speed serial interface 27 (such as a standard IEEE 1394 interface), a standard JPEG decoder 28, a standard Group 4 Fax decoder, a custom halftoner/compositor unit 29, a custom tag encoder 30, a line loader/formatter unit 31, and a custom interface 32 to the print head 33. The decoders 28,88 and encoder 30 are buffered to the halftoner/compositor 29. The tag encoder 30 establishes an infrared tag or tags to a page according to protocols dependent on what uses might be made of the page and the actual content of a tag is not the subject of the present invention.

The print engine works in a double buffered way. One page is loaded into DRAM 34 via DRAM interface 89 and data bus 90 from the high speed serial interface 27 while the previously loaded page is read from DRAM 34 and passed through the print engine pipeline. Once the page has finished printing, then the page just loaded becomes the page being printed, and a new page is loaded via the high-speed serial interface 27. At the first stage the pipeline expands any JPEG-compressed contone (CMYK) layer, and expands any of two Group 4 Fax-compressed bi-level data streams. The two streams are the black layer (although the PEC is actually color agnostic and this bi-level layer can be directed to any of the output inks), and a matte for selecting between dither matrices for contone dithering (see below). At the second stage, in parallel with the first, is encoded any tags for later rendering in either IR or black ink. Finally the third stage dithers the contone layer, and composites position tags and the bi-level spot1 layer over the resulting bi-level dithered layer. The data stream is ideally adjusted to create smooth transitions across overlapping segments in the print head and ideally it is adjusted to compensate for dead nozzles in the print head. Up to 6 channels of bi-level data are produced from this stage. Note that not all 6 channels may be present on the print head. For example, the print head may be CMY only, with K pushed into the CMY channels and IR ignored. Alternatively, the position tags may be printed in K if IR ink is not available (or for testing purposes). The resultant bi-level CMYK-IR dot-data is buffered and formatted for printing on the print head 33 via a set of line buffers (see below). The majority of these line buffers might be ideally stored on the off-chip DRAM 34. The final stage prints the 6 channels of bi-level dot data via the print head interface 32.

Compression is used in a printing system that employs the PEC. This is to reduce bandwidth requirements between a host and PEC, as well as to reduce memory requirements for page storage. At 267 ppi, a Letter page of contone CMYK data has a size of 25 MB. Using lossy contone compression algorithms such as JPEG (see below), contone images compress with a ratio up to 10:1 without noticeable loss of quality, giving a compressed page size of 2.5 MB. At 800 dpi, a Letter page of bi-level data has a size of 7 MB. Coherent data such as text compresses very well. Using lossless bi-level compression algorithms such as Group 4 Facsimile (see below), ten-point text compresses with a ratio of about 10:1, giving a compressed page size of 0.8 MB. Once dithered, a page of CMYK contone image data consists of 114 MB of bi-level data. The two-layer compressed page image format described below exploits the relative strengths of lossy JPEG contone image compression and lossless bi-level text compression. The format is compact enough to be storage-efficient, and simple enough to allow straightforward real-time expansion during printing. Since text and images normally don't overlap, the normal worst-case page image size is 2.5 MB (i.e. image only), while the normal best-case page image size is 0.8 MB (i.e. text only). The absolute worst-case page image size is 3.3 MB (i.e. text over image). Assuming a quarter of an average page contains images, the average page image size is 1.2 MB.

A Group 3 Facsimile compression algorithm (see ANSI/EIA 538–1988, *Facsimile Coding Schemes and Coding Control Functions for Group 4 Facsimile Equipment*, August 1988) can be used to losslessly compresses bi-level data for transmission over slow and noisy telephone lines. The bi-level data represents scanned black text and graphics on a white background, and the algorithm is tuned for this class of images (it is explicitly not tuned, for example, for halftoned bi-level images). The 1D Group 3 algorithm runlength-encodes each scanline and then Huffman-encodes the resulting runlengths. Runlengths in the range 0 to 63 are coded with terminating codes. Run-lengths in the range 64 to 2623 are coded with make-up codes, each representing a multiple of 64, followed by a terminating code. Runlengths exceeding 2623 are coded with multiple make-up codes followed by a terminating code. The Huffman tables are fixed, but are separately tuned for black and white runs (except for make-up codes above 1728, which are common). When possible, the 2D Group 3 algorithm encodes a scanline as a set of short edge deltas (±0, ±1, ±2, ±3) with reference to the previous scanline. The delta symbols are entropy-encoded (so that the zero delta symbol is only one bit long etc.) Edges within a 2D-encoded line that can't be delta-encoded are runlength-encoded, and are identified by a prefix. 1D- and 2D-encoded lines are marked differently. 1D-encoded lines are generated at regular intervals, whether actually required or not, to ensure that the decoder can recover from line noise with minimal image degradation. 2D Group 3 achieves compression ratios of up to 6:1 (see Urban, S. J., "Review of standards for electronic imaging for facsimile systems", Journal of Electronic Imaging, Vol. 1(1), January 1992, pp. 5–21).

A Group 4 Facsimile algorithm (see ANSI/EIA 538–1988, Facsimile Coding Schemes and Coding Control Functions for Group 4 Facsimile Equipment, August 1988) losslessly compresses bi-level data for transmission over error-free communications lines (i.e. the lines are truly error-free, or error-correction is done at a lower protocol level). The Group 4 algorithm is based on the 2D Group 3 algorithm, with the essential modification that since transmission is assumed to be error-free, 1D-encoded lines are no longer generated at regular intervals as an aid to error-recovery. Group 4 achieves compression ratios ranging from 20:1 to 60:1 for the CCITT set of test images. The design goals and performance of the Group 4 compression algorithm qualify it as a compression algorithm for the bi-level layers. However, its Huffman tables are tuned to a lower scanning resolution (100–400 dpi), and it encodes runlengths exceeding 2623 awkwardly. At 800 dpi, our maximum runlength is currently 6400. Although a Group 4 decoder core would be available for use in PEC, it might not handle runlengths exceeding those normally encountered in 400 dpi facsimile applications, and so would require modification. The (typically 1600 dpi) black layer is losslessly compressed using G4Fax at a typical compression ratio exceeding 10:1. A (typically 320 dpi) dither matrix select layer, which matches the contone color layer, is losslessly compressed using G4Fax at a typical compression ratio exceeding 50:1.

The Group 4 Fax (G4 Fax) decoder is responsible for decompressing bi-level data. Bi-level data is limited to a single spot color (typically black for text and line graphics), and a dither matrix select bit-map for use in subsequent dithering of the contone data (decompressed by the JPEG decoder). The input to the G4 Fax decoder is 2 planes of bi-level data, read from the external DRAM. The output of the G4 Fax decoder is 2 planes of decompressed bi-level data. The decompressed bi-level data is sent to the Halftoner/Compositor Unit (HCU) for the next stage in the printing pipeline. Two bi-level buffers provides the means for transferring the bi-level data between the G4 Fax decoder and the HCU. Each decompressed bi-level layer is output to two line buffers. Each buffer is capable of holding a full 12 inch line of dots at the expected maximum resolution. Having two line buffers allows one line to be read by the HCU while the other line is being written to by the G4 Fax decoder. This is important because a single bi-level line is typically less than 1600 dpi, and must therefore be expanded in both the dot and line dimensions. If the buffering were less than a full line, the G4 Fax decoder would have to decode the same line multiple times—once for each output 600 dpi dotline.

Spot color 1 is designed to allow high resolution dot data for a single color plane of the output image. While the contone layers provide adequate resolution for images, spot color 1 is targeted at applications such as text and line graphics (typically black). When used as text and line graphics, the typical compression ratio exceeds 10:1. Spot color 1 allows variable resolution up to 1600 dpi for maximum print quality. Each of the two line buffers is therefore total 2400 bytes (12 inches×1600 dpi=19,200 bits).

The resolution of the dither matrix select map should ideally match the contone resolution. Consequently each of the two line buffers is therefore 480 bytes (3840 bits), capable of storing 12 inches at 320 dpi. When the map matches the contone resolution, the typical compression ratio exceeds 50:1.

In order to provide support for:
800 dpi spot color 1 layer (typically black)
320 dpi dither matrix select layer the decompression bandwidth requirements are 9.05 MB/sec for 1 page per second performance (regardless of whether the page width is 12 inches or 8.5 inches), and 20 MB/sec and 14.2 MB/sec for 12 inch and 8.5 inch page widths respectively during maximum printer speed performance (30,000 lines per second). Given that the decompressed data is output to a line buffer, the G4 Fax decoder can readily decompress a line from each of the outputs one at a time.

The G4 Fax decoder is fed directly from the main memory via the DRAM interface. The amount of compression determines the bandwidth requirements to the external DRAM. Since G4 Fax is lossless, the complexity of the image impacts on the amount of data and hence the bandwidth. typically an 800 dpi black text/graphics layer exceeds 10:1 compression, so the bandwidth required to print 1 page per second is 0.78 MB/sec. Similarly, a typical 320 dpi dither select matrix compresses at more than 50:1, resulting in a 0.025 MB/sec bandwidth. The fastest printing speed configuration of 320 dpi for dither select matrix and 800 dpi for spot color 1 requires bandwidth of 1.72 MB/sec and 0.056 MB/sec respectively. A total bandwidth of 2 MB/sec should therefore be more than enough for the DRAM bandwidth.

The G4 Fax decoding functionality is implemented by means of a G4 Fax Decoder core. A wide variety of G4Fax Decoder cores are suitable: it can be any core with sufficient processing power to perform the required calculations and control functions fast enough. It must be capable of handling runlengths exceeding those normally encountered in 400 dpi facsimile applications, and so may require modification.

A JPEG compression algorithm (see ISO/IEC 19018-1: 1994, *Information technology—Digital compression and coding of continuous-tone still images: Requirements and guidelines,* 1994) lossily compresses a contone image at a specified quality level. It introduces imperceptible image degradation at compression ratios below 5:1, and negligible image degradation at compression ratios below 10:1 (see Wallace, G. K., "The JPEG Still Picture Compression Standard", Communications of the ACM, Vol. 34, No. 4, April 1991, pp. 30–44). JPEG typically first transforms the image into a color space that separates luminance and chrominance into separate color channels. This allows the chrominance channels to be subsampled without appreciable loss because of the human visual system's relatively greater sensitivity to luminance than chrominance. After this first step, each color channel is compressed separately. The image is divided into 8×8 pixel blocks. Each block is then transformed into the frequency domain via a discrete cosine transform (DCT). This transformation has the effect of concentrating image energy in relatively lower-frequency coefficients, which allows higher-frequency coefficients to be more crudely quantized. This quantization is the principal source of compression in JPEG. Further compression is achieved by ordering coefficients by frequency to maximize the likelihood of adjacent zero coefficients, and then runlength-encoding runs of zeroes. Finally, the runlengths and non-zero frequency coefficients are entropy coded. Decompression is the inverse process of compression.

The CMYK (or CMY) contone layer is compressed to a planar color JPEG bytestream. If luminance/chrominance separation is deemed necessary, either for the purposes of table sharing or for chrominance subsampling, then CMYK is converted to YCrCb and Cr and Cb are duly subsampled. The JPEG bytestream is complete and self-contained. It contains all data required for decompression, including quantization and Huffman tables.

The JPEG decoder is responsible for performing the on-the-fly decompression of the contone data layer. The input to the JPEG decoder is up to 4 planes of contone data. This will typically be 3 planes, representing a CMY contone image, or 4 planes representing a CMYK contone image. Each color plane can be in a different resolution, although typically all color planes will be the same resolution. The contone layers are read from the external DRAM. The output of the JPEG decoder is the decompressed contone data, separated into planes. The decompressed contone image is sent to the halftoner/compositor unit (HCU) 29 for the next stage in the printing pipeline. The 4-plane contone buffer provides the means for transferring the contone data between the JPEG decoder and the HCU 29.

Each color plane of the decompressed contone data is output to a set of two line buffers (see below). Each line buffer is 3840 bytes, and is therefore capable of holding 12 inches of a single color plane's pixels at 320 ppi. The line buffering allows one line buffer to be read by the HCU while the other line buffer is being written to by the JPEG decoder. This is important because a single contone line is typically less than 1600 ppi, and must therefore be expanded in both the dot and line dimensions. If the buffering were less than a full line, the JPEG decoder would have to decode the same line multiple times—once for each output 600 dpi dotline. Although a variety of resolutions is supported, there is a tradeoff between the resolution and available bandwidth. As resolution and number of colors increase, bandwidth requirements also increase. In addition, the number of segments being targeted by the PEC chip also affects the bandwidth and possible resolutions. Note that since the contone image is processed in a planar format, each color plane can be stored at a different resolution (for example CMY may be a higher resolution than the K plane). The highest supported contone resolution is 1600 ppi (matching the printer's full dot resolution). However there is only enough output line buffer memory to hold enough contone pixels for a 320 ppi line of length 12 inches. If the full 12 inches of output was required at higher contone resolution, multiple PEC chips would be required, although it should be noted that the final output on the printer will still only be bi-level. With support for 4 colors at 320 ppi, the decompression output bandwidth requirements are 40 MB/sec for 1 page per second performance (regardless of whether the page width is 12 inches or 8.5 inches), and 88 MB/sec and 64 MB/sec for 12 inch and 8.5 inch page widths respectively during maximum printer speed performance (30,000 lines per second).

The JPEG decoder is fed directly from the main memory via the DRAM interface. The amount of compression determines the bandwidth requirements to the external DRAM. As the level of compression increases, the bandwidth decreases, but the quality of the final output image can also decrease. The DRAM bandwidth for a single color plane can be readily calculated by applying the compression factor to the output bandwidth. For example, a single color plane at 320 ppi with a compression factor of 10:1 requires 1 MB/sec access to DRAM to produce a single page per second.

Figure 4:
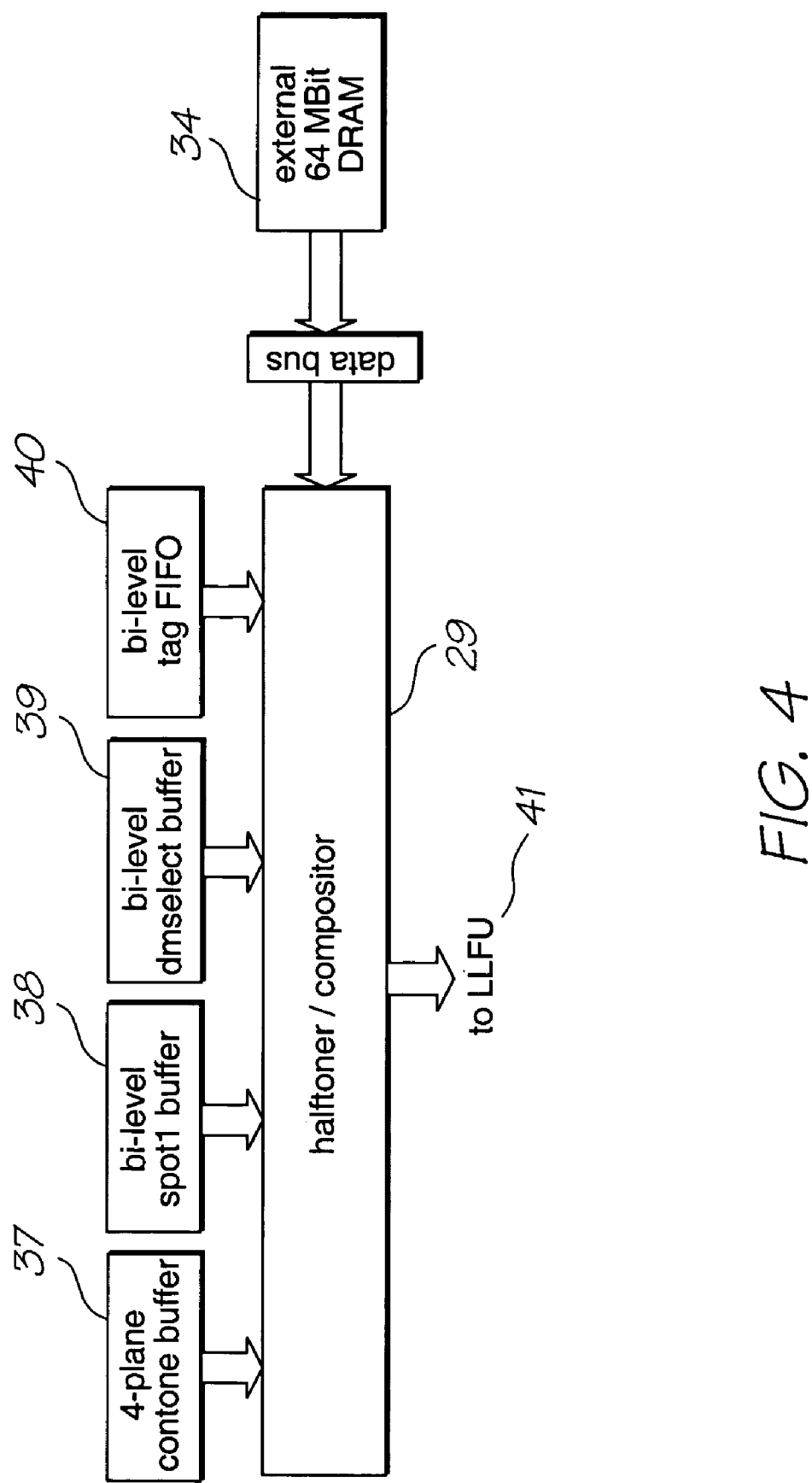
FIG. 4 illustrates the external interfaces to the halftoner/compositor unit (HCU) of FIG. 3.

The JPEG functionality is implemented by means of a JPEG core. A wide variety of JPEG cores are suitable: it can be any JPEG core with sufficient processing power to perform the required calculations and control functions fast enough. For example, the BTG X-Match core has decompression speeds up to 140 MBytes/sec, which allows decompression of 4 color planes at contone resolutions up to 400 ppi for the maximum printer speed (30,000 lines at 1600 dpi per second), and 800 ppi for 1 page/sec printer speed. Note that the core needs to only support decompression, reducing the requirements that are imposed by more generalized JPEG compression/decompression cores. The size of the core is expected to be no more than 100,000 gates. Given that the decompressed data is output to a line buffer, the JPEG decoder can readily decompress an entire line for each of the color planes one at a time, thus saving on context switching during a line and simplifying the control of the JPEG decoder. 4 contexts must be kept (1 context for each color plane), and includes current address in the external DRAM as well as appropriate JPEG decoding parameters In FIG. 4 the halftoner/compositor unit (HCU) 29 combines the functions of halftoning the contone (typically CMYK) layer to a bi-level version of the same, and compositing the spot1 bi-level layer over the appropriate halftoned contone layer(s). If there is no K ink in the printer, the HCU 29 is able to map K to CMY dots as appropriate. It also selects between two dither matrices on a pixel by pixel basis, based on the corresponding value in the dither matrix select map. The input to the HCU 29 is an expanded contone layer (from the JPEG decoder unit) through buffer 37, an expanded bi-level spot1 layer through buffer 38, an expanded dither-matrix-select bitmap at typically the same resolution as the contone layer through buffer 39, and tag data at full dot resolution through buffer 40. The HCU 29 uses up to two dither matrices, read from the external DRAM 34. The output from the HCU 29 to the line loader/format unit (LLFU) at 41 is a set of printer resolution bi-level image lines in up to 6 color planes. Typically, the contone layer is CMYK or CMY, and the bi-level spot1 layer is K.

Figure 5:
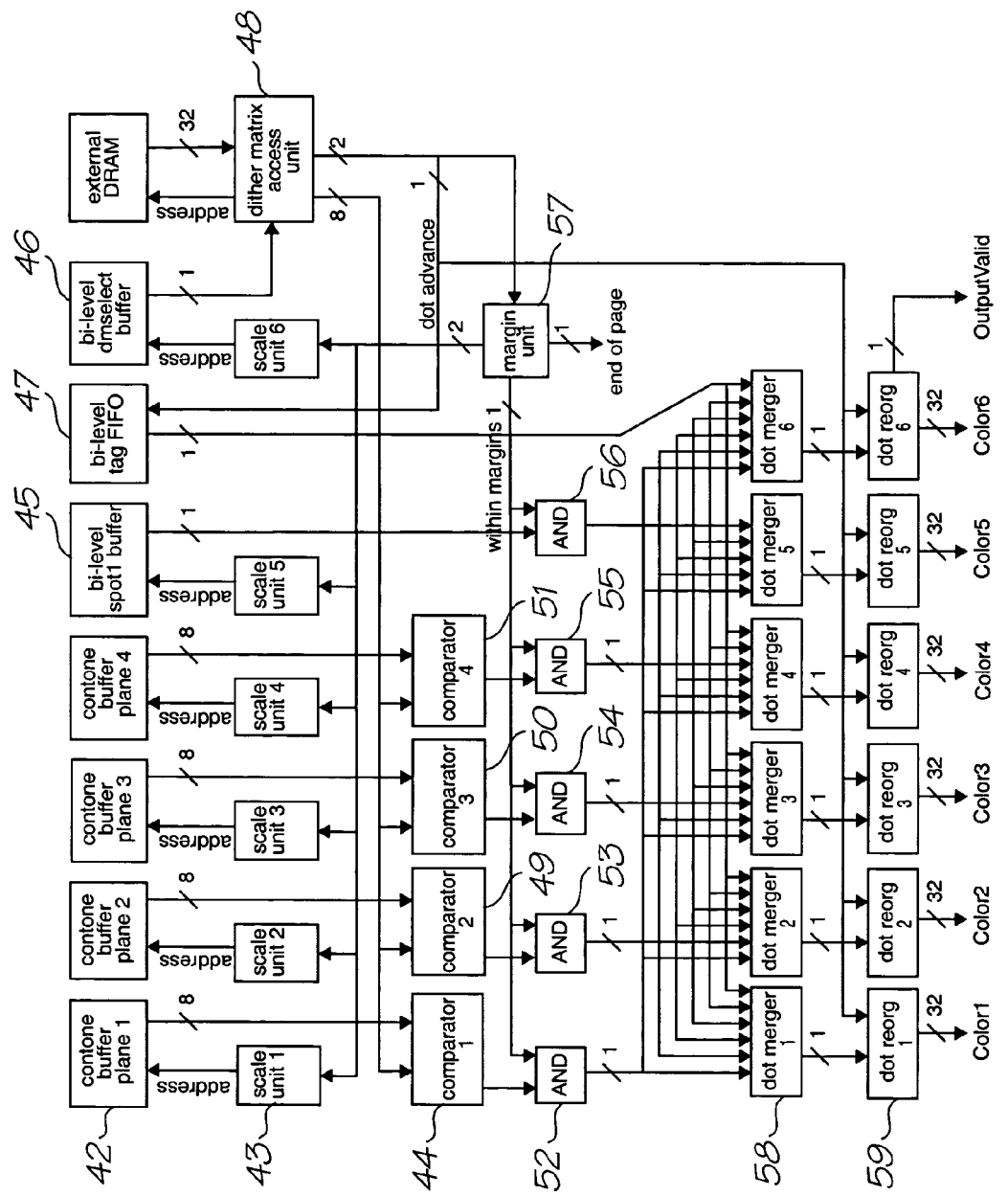
FIG. 5 is a diagram showing internal circuitry to the HCU of FIG. 4.

In FIG. 5 is seen the HCU in greater detail. Once started, the HCU proceeds until it detects an end-of-page condition, or until it is explicitly stopped via its control register. The first task of the HCU is to scale, in the respective scale units such as the scale unit 43, all data, received in the buffer planes such as 42, to printer resolution both horizontally and vertically.

The scale unit provides a means of scaling contone or bi-level data to printer resolution both horizontally and vertically. Scaling is achieved by replicating a data value an integer number of times in both dimensions. Processes by which to scale data will be familiar to those skilled in the art.

Two control bits are provided to the scale unit 43 by the margin unit 57: advance dot and advance line. The advance dot bit allows the state machine to generate multiple instances of the same dot data (useful for page margins and creating dot data for overlapping segments in the print head). The advance line bit allows the state machine to control when a particular line of dots has been finished, thereby allowing truncation of data according to printer margins. It also saves the scale unit from requiring special end-of-line logic. The input to the scale unit is a full line buffer. The line is used scale factor times to effect vertical up-scaling via line replication, and within each line, each value is used scale factor times to effect horizontal up-scaling via pixel replication. Once the input line has been used scale factor times (the advance line bit has been set scale factor times), the input buffer select bit of the address is toggled (double buffering). The logic for the scale unit is the same for the 8-bit and 1-bit case, since the scale unit only generates addresses.

Since each of the contone layers can be a different resolution, they are scaled independently. The bi-level spot1 layer at buffer 45 and the dither matrix select layer at buffer 46 also need to be scaled. The bi-level tag data at buffer 47 is established at the correct resolution and does not need to be scaled. The scaled-up dither matrix select bit is used by the dither matrix access unit 48 to select a single 8-bit value from the two dither matrices. The 8-bit value is output to the 4 comparators 44, and 49 to 51, which simply compare it to the specific 8-bit contone value. The generation of an actual dither matrix is dependent on the structure of the print head and the general processes by which to generate one will be familiar to those skilled in the art. If the contone value is greater than or equal to the 8-bit dither matrix value a 1 is output. If not, then a 0 is output. These bits are then all ANDed at 52 to 56 with an inPage bit from the margin unit 57 (whether or not the particular dot is inside the printable area of the page). The final stage in the HCU is the compositing stage. For each of the 6 output layers there is a single dot merger unit, such as unit 58, each with 6 inputs. The single output bit from each dot merger unit is a combination of any or all of the input bits. This allows the spot color to be placed in any output color plane (including infrared for testing purposes), black to be merged into cyan, magenta and yellow (if no black ink is present in the print head), and tag dot data to be placed in a visible plane. A fixative color plane can also be readily generated. The dot reorg unit (DRU) 59 is responsible for taking the generated dot stream for a given color plane and organizing it into 32-bit quantities so that the output is in segment order, and in dot order within segments. Minimal reordering is required due to the fact that dots for overlapping segments are not generated in segment order.

Two control bits are provided to the scale units by the margin unit 57: advance dot and advance line. The advance dot bit allows the state machine to generate multiple instances of the same dot data (useful for page margins and creating dot data for overlapping segments in the print head). The advance line bit allows the state machine to control when a particular line of dots has been finished, thereby allowing truncation of data according to printer margins. It also saves the scale unit from requiring special end-of-line logic.

The comparator unit contains a simple 8-bit "greater-than-or-equal" comparator. It is used to determine whether the 8-bit contone value is greater than or equal to the 8-bit dither matrix value. As such, the comparator unit takes two 8-bit inputs and produces a single 1-bit output.

Figure 6:
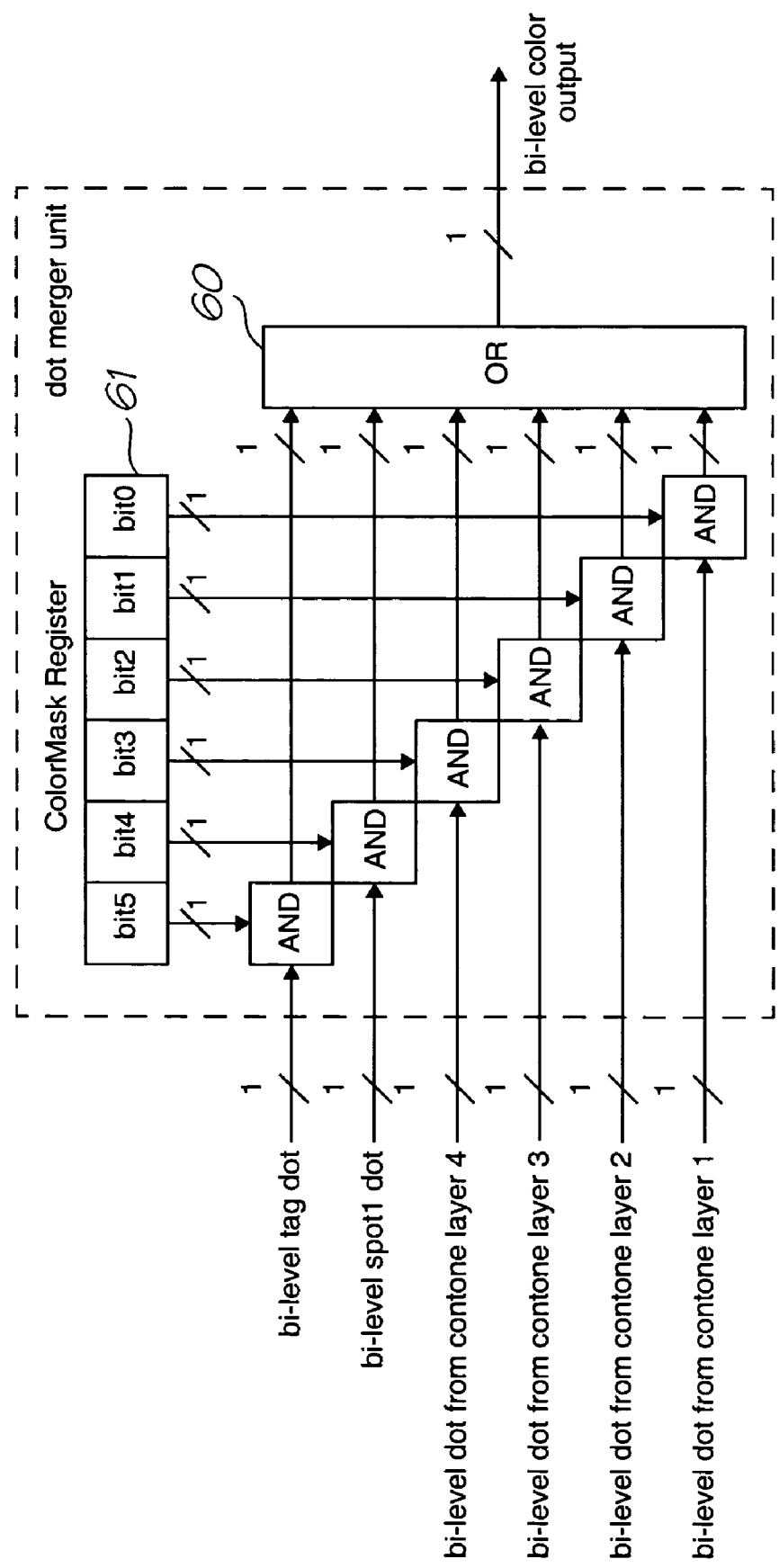
FIG. 6 shows a block diagram illustrating the process within the dot merger unit of FIG. 5.

In FIG. 6 is seen more detail of the dot merger unit. It provides a means of mapping the bi-level dithered data, the spot1 color, and the tag data to output inks in the actual print head. Each dot merger unit takes 6 1-bit inputs and produces a single bit output that represents the output dot for that color plane. The output bit at 60 is a combination of any or all of the input bits. This allows the spot color to be placed in any output color plane (including infrared for testing purposes), black to be merged into cyan, magenta and yellow (in the case of no black ink in the print head), and tag dot data to be placed in a visible plane. An output for fixative can readily be generated by simply combining all of the input bits. The dot merger unit contains a 6-bit ColorMask register 61 that is used as a mask against the 6 input bits. Each of the input bits is ANDed with the corresponding ColorMask register bit, and the resultant 6 bits are then ORed together to form the final output bit.

Figure 7:
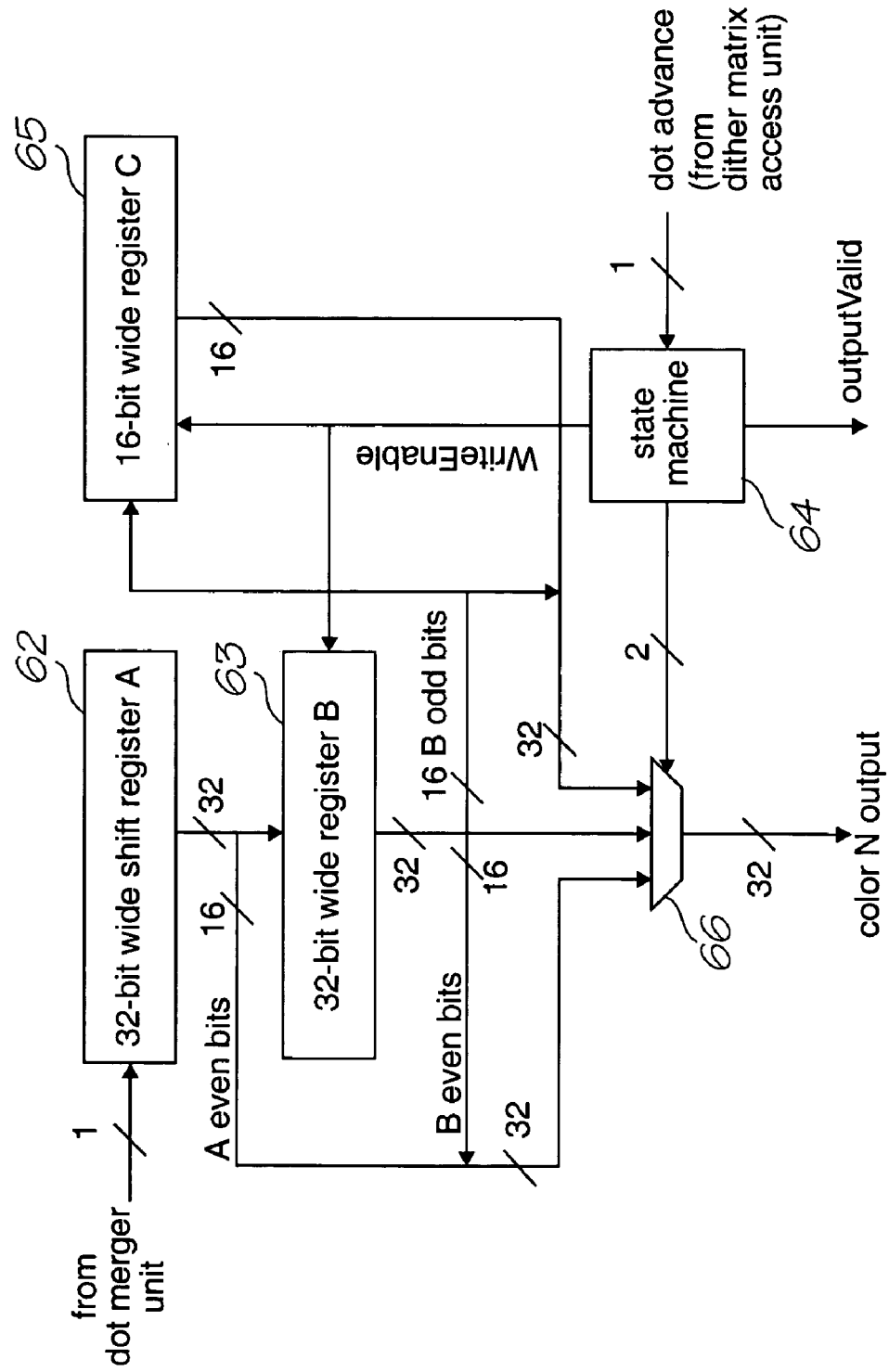
FIG. 7 shows a diagram illustrating the process within the dot reorganization unit of FIG. 5.

In FIG. 7 is seen the dot reorg unit (DRU) which is responsible for taking the generated dot stream for a given color plane and organizing it into 32-bit quantities so that the output is in segment order, and in dot order within segments. Minimal reordering is required due to the fact that dots for overlapping segments are not generated in segment order. The DRU contains a 32-bit shift register, a regular 32-bit register, and a regular 16-bit register. A 5-bit counter keeps track of the number of bits processed so far. The dot advance signal from the dither matrix access unit (DMAU) is used to instruct the DRU as to which bits should be output.

In FIG. 7 register(A) 62 is clocked every cycle. It contains the 32 most recent dots produced by the dot merger unit (DMU). The full 32-bit value is copied to register(B) 63 every 32 cycles by means of a WriteEnable signal produced by the DRU state machine 64 via a simple 5-bit counter. The 16 odd bits (bits 1, 3, 5, 7 etc.) from register(B) 63 are copied to register(C) 65 with the same WriteEnable pulse. A 32-bit multiplexor 66 then selects between the following 3 outputs based upon 2 bits from the state machine:
the full 32 bits from register B
A 32-bit value made up from the 16 even bits of register A (bits 0, 2, 4, 6 etc.) and the 16 even bits of register B. The 16 even bits from register A form bits 0 to 15, while the 16 even bits from register B form bits 16–31.

A 32-bit value made up from the 16 odd bits of register B (bits 1, 3, 5, 7 etc.) and the 16 bits of register C. The bits of register C form bits 0 to 15, while the odd bits from register B form bits 16–13.

The state machine for the DRU can be seen in Table 1. It starts in state 0. It changes state every 32 cycles. During the 32 cycles a single noOverlap bit collects the AND of all the dot advance bits for those 32 cycles (noOverlap=dot advance for cycle 0, and noOverlap=noOverlap AND dot advance for cycles 1 to 31).

TABLE 1

State machine for DRU

| state | NoOverlap | Output | output Valid | Comment | next state |
|---|---|---|---|---|---|
| 0 | X | B | 0 | Startup state | 1 |
| 1 | 1 | B | 1 | Regular non-overlap | 1 |
| 1 | 0 | B | 1 | A contains first overlap | 2 |
| 2 | X | Even A, even B | 1 | A contains second overlap B contains first overlap | 3 |
| 3 | X | C, odd B | 1 | C contains first overlap B contains second overlap | |

The margin unit (MU) 57, in FIG. 5, is responsible for turning advance dot and advance line signals from the dither matrix access unit (DMAU) 48 into general control signals based on the page margins of the current page. It is also responsible for generating the end of page condition. The MU keeps a counter of dot and line across the page. Both are set to 0 at the beginning of the page. The dot counter is advanced by 1 each time the MU receives a dot advance signal from the DMAU. When the MU receives a line advance signal from the DMAU, the line counter is incremented and the dot counter is reset to 0. Each cycle, the current line and dot values are compared to the margins of the page, and appropriate output dot advance, line advance and within margin signals are given based on these margins. The DMAU contains the only substantial memory requirements for the HCU.

Figure 8:
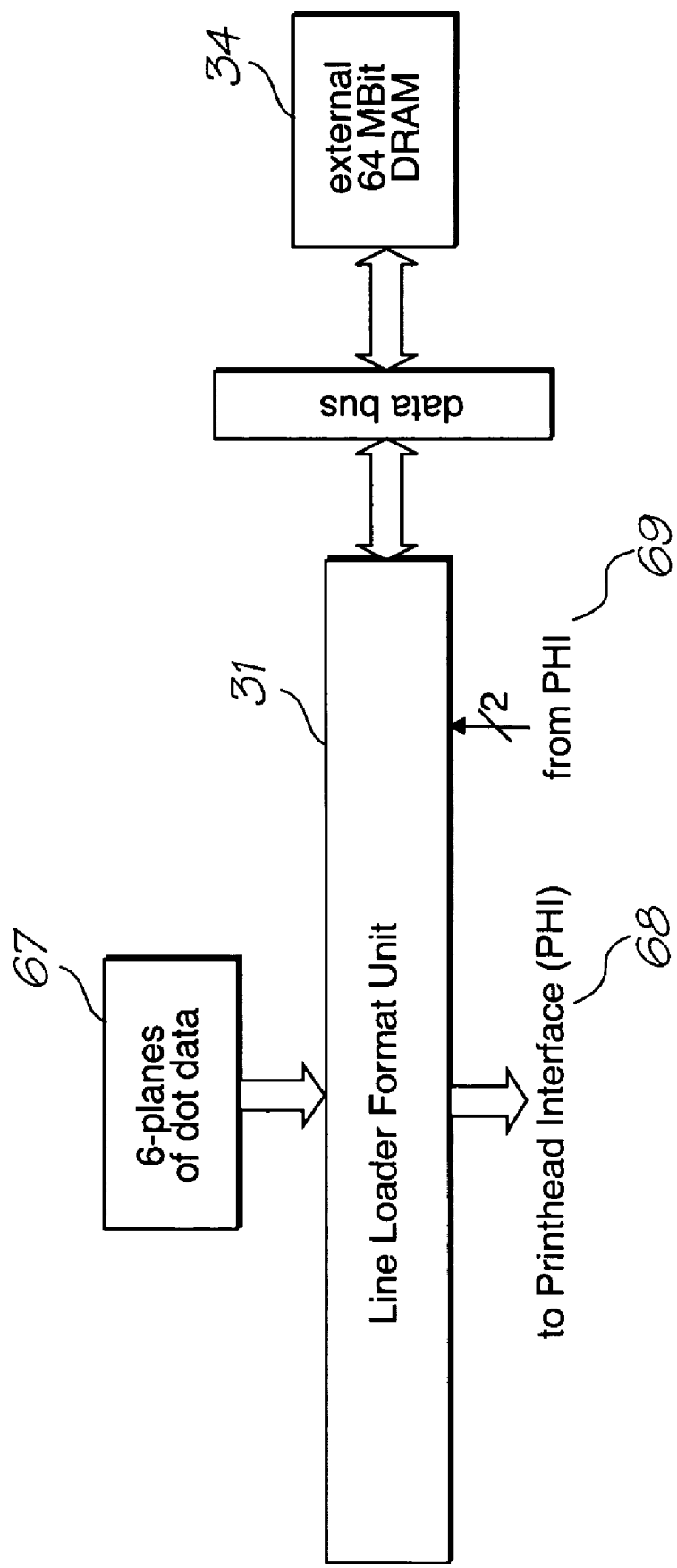
FIG. 8 shows a diagram illustrating the process within the line loader/format unit (LLFU) of FIG. 5.
Figure 9:
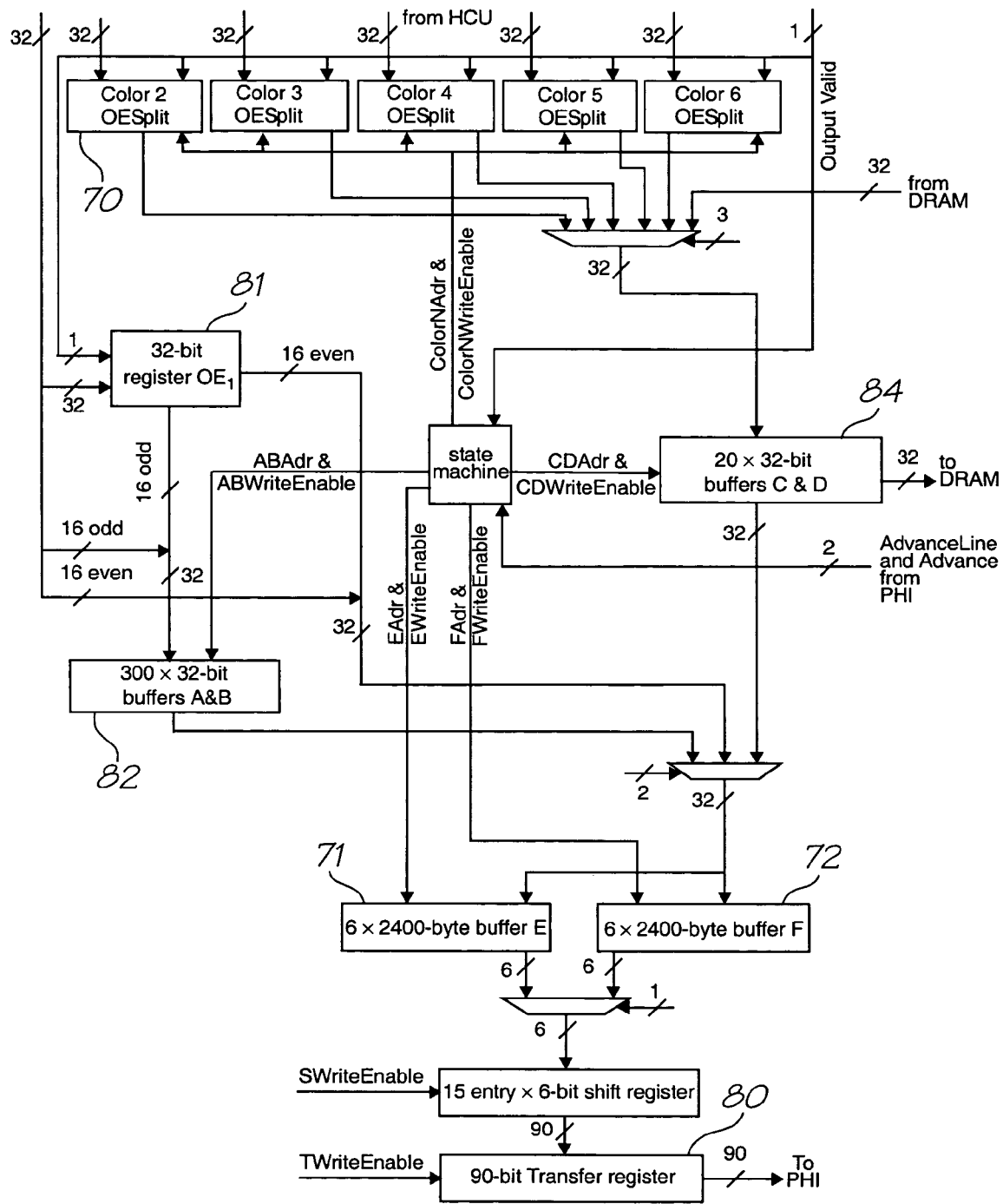
FIG. 9 is a diagram showing internal circuitry to generate color data in the LLFU of FIG. 8.

In FIG. 8 is seen the line loader/format unit (LLFU). It receives dot information from the HCU, loads the dots for a given print line into appropriate buffer storage (some on chip, and some in external DRAM 34) and formats them into the order required for the print head. A high level block diagram of the LLFU in terms of its external interface is shown in FIG. 9. The input 67 to the LLFU is a set of 6 32-bit words and a DataValid bit, all generated by the HCU. The output 68 is a set of 90 bits representing a maximum of 15 print head segments of 6 colors. Not all the output bits may be valid, depending on how many colors are actually used in the print head.

The physical placement of firing nozzles on the print head referenced above, nozzles in two offset rows, means that odd and even dots of the same color are for two different lines. The even dots are for line L, and the odd dots are for line L-2. In addition, there is a number of lines between the dots of one color and the dots of another. Since the 6 color planes for the same dot position are calculated at one time by the HCU, there is a need to delay the dot data for each of the color planes until the same dot is positioned under the appropriate color nozzle The size of each buffer line depends on the width of the print head. Since a single PEC generates dots for up to 15 print head segments, a single odd or even buffer line is therefore 15 sets of 640 dots, for a total of 9600 bits (1200 bytes). For example, the buffers required for color 6 odd dots totals almost 45 KBytes.

The entire set of requisite buffers might be provided on the PEC chip when manufacturing techniques are capable. Otherwise, the buffers for colors 2 onward may be stored in external DRAM. This enables the PEC to be valid even though the distance between color planes may change in the future. It is trivial to keep the even dots for color 1 on PEC, since everything is printed relative to that particular dot line (no additional line buffers are needed). In addition, the 2 half-lines required for buffering color 1 odd dots saves substantial DRAM bandwidth. The various line buffers (on chip and in DRAM) need to be pre-loaded with all 0s before the page is printed so that it has clean edges. The end of the page is generated automatically by the HCU so it will have a clean edge.

Figure 10:
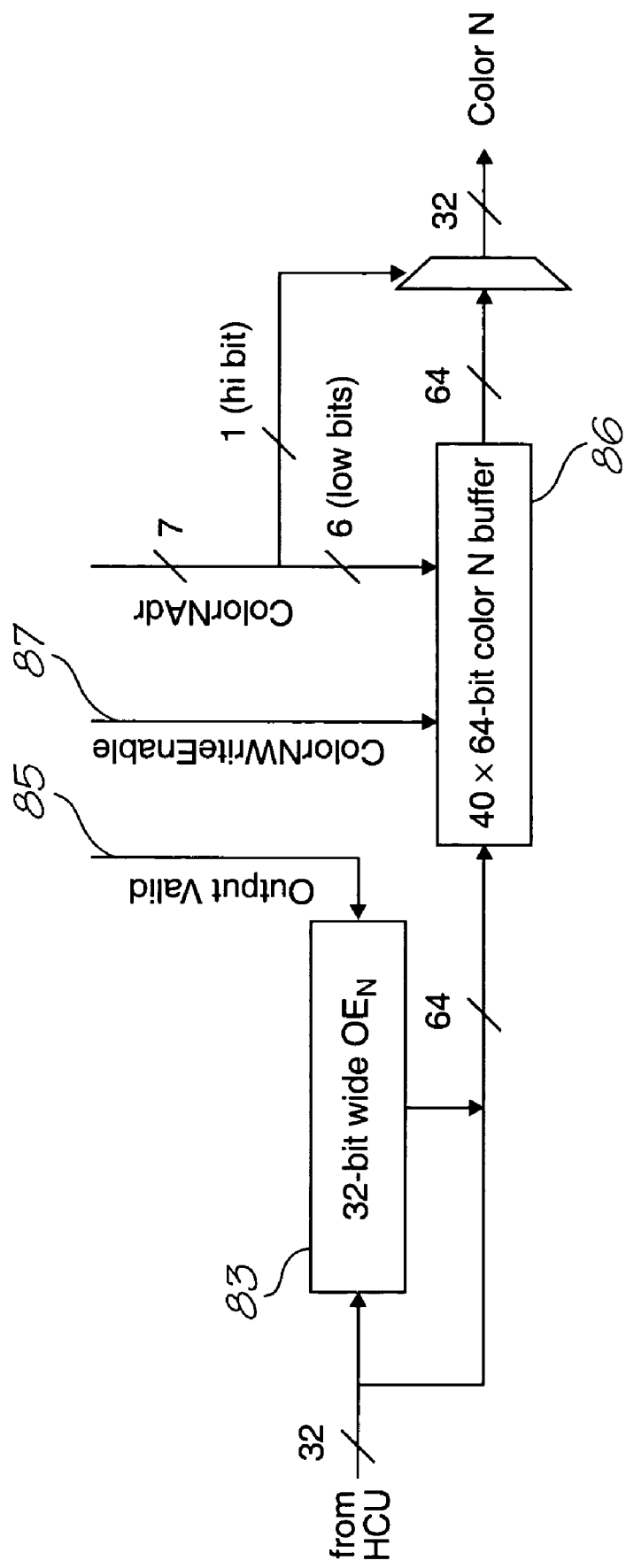
FIGS. 10 and 11 illustrate components of the LLFU seen in FIG. 9.
Figure 11:
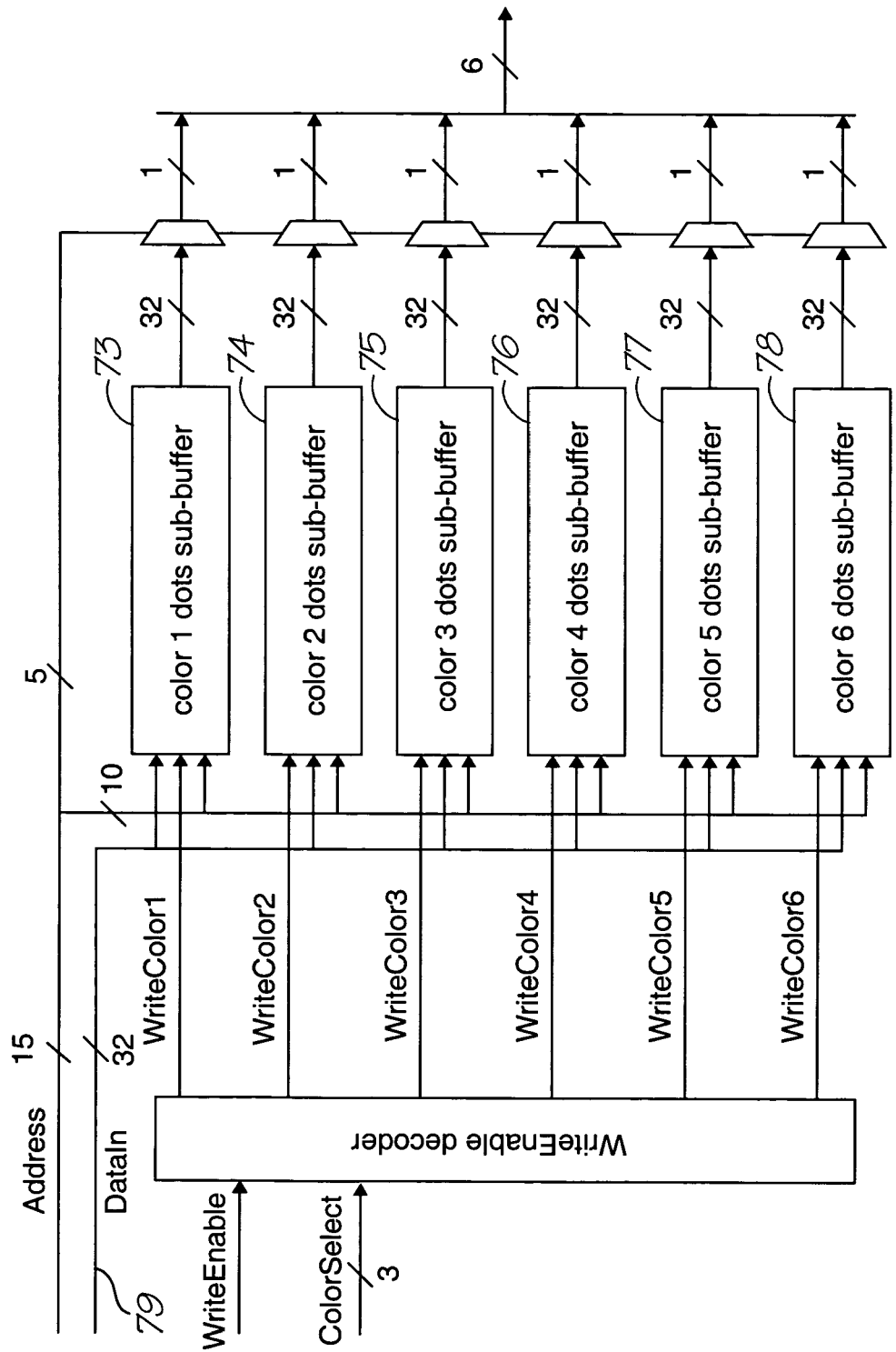

In FIG. 10 is seen a block diagram for Color N OESplit (see Oesplit 70 of FIG. 9), and the block diagram for each of the two buffers E and F, 71,72 in FIG. 9 can be found in FIGS. 10 and 11. Buffer EF is a double buffered mechanism for transferring data to the print head interface (PHI) 32 in FIG. 3. Buffers E and F therefore have identical structures. During the processing of a line of dots, one of the two buffers is written to while the other is being read from. The two buffers are logically swapped upon receipt of the line-sync signal from the PHI. Both buffers E and F are composed of 6 sub-buffers, 1 sub-buffer per color, as shown in FIG. 11, the color 1 sub-buffer numbered 73. The size of each sub-buffer is 2400 bytes, enough to hold 15 segments at 1280 dots per segment. The memory is accessed 32-bits at a time, so there are 600 addresses for each sub-buffer (requiring 10 bits of address). All the even dots are placed before the odd dots in each color's sub-buffer. If there is any unused space (for printing to fewer than 15 segments) it is located at the end of each color's sub-buffer. The amount of memory actually used from each sub-buffer is directly related to the number of segments actually addressed by the PEC. For a 15 segment print head there are 1200 bytes of even dots followed by 1200 bytes of odd dots, with no unused space. The number of sub-buffers gainfully used is directly related to the number of colors used in the print head. The maximum number of colors supported is 6.

The addressing decoding circuitry for each of buffers E and F is such that in a given cycle, a single 32-bit access can be made to all 6 sub-buffers—either a read from all 6 or a write to one of the 6. Only one bit of the 32-bits read from each color buffer is selected, for a total of 6 output bits. The process is shown in FIG. 11. 15 bits of address allow the reading of a particular bit by means of 10-bits of address being used to select 32 bits, and 5-bits of address choose 1-bit from those 32. Since all color sub-buffers share this logic, a single 15-bit address gives a total of 6 bits out, one bit per color. Each sub-buffer 73 to 78 has its own WriteEnable line, to allow a single 32-bit value to be written to a particular color buffer in a given cycle. The individual WriteEnables are generated by ANDing the single WriteEnable input with the decoded form of ColorSelect. The 32-bits of DataIn on line 79 are shared, since only one buffer will actually clock the data in.

Address generation for reading from buffers E and F is straightforward. Each cycle generates a bit address that is used to fetch 6 bits representing 1-bit per color for a particular segment. By adding 640 to the current bit address, we advance to the next segment's equivalent dot. We add 640 (not 1280) since the odd and even dots are separated in the buffer. We do this NumSegments times to retrieve the data representing the even dots, and transfer those bits to the PHI. When NumSegments=15, the number of bits is 90 (15×6 bits). The process is then repeated for the odd dots. This entire even/odd bit generation process is repeated 640 times, incrementing the start address each time. Thus all dot values are transferred to the PHI in the order required by the print head in 640×2×NumSegments cycles. When NumSegments=15, the number of cycles is 19,200 cycles. Note that regardless of the number of colors actually used in the print head, 6 bits are produced in a given read cycle (one bit from each color's buffer).

In addition, we generate the TWriteEnable control signal for writing to the 90-bit Transfer register 90 in FIG. 9. Since the LLFU starts before the PHI, we must transfer the first value before the Advance pulse from the PHI. We must also generate the next value in readiness for the first Advance pulse. The solution is to transfer the first value to the Transfer register after NumSegments cycles, and then to stall NumSegments cycles later, waiting for the Advance pulse to start the next NumSegments cycle group. Once the first Advance pulse arrives, the LLFU is synchronized to the PHI.

The read process for a single dotline is shown in the following pseudocode:

```
DoneFirst = FALSE
WantToXfer = FALSE
For DotInSegment0 = 0 to 1279
    If (DotInSegment0:bit0 == 0)
        CurrAdr = DotInSegment0 (high bits) (puts in range 0 to 639)
    EndIf
    XfersRemaining = NumSegments
    Do
        WantToXfer = (XfersRemaining == 0)
        TWriteEnable = (WantToXfer AND NOT DoneFirst)
            OR PHI:ADVANCE
        DoneFirst = DoneFirst OR TWriteEnable
        Stall = WantToXfer AND (NOT TWriteEnable)
        SWriteEnable = NOT(Stall)
        If (SWriteEnable)
            Shift Register = Fetch 6 bits from
                EFSense[ReadBuffer]:CurrAdr
            CurrAdr = CurrAdr + 640
            XfersRemaining = XfersRemaining - 1
        EndIf
    Until (TWriteEnable)
EndFor
Wait until BufferEF Write process has finished
EFSense = NOT (EFSense)
```

While read process is transferring data from E or F to the PHI, a write process is preparing the next dot-line in the other buffer.

The data being written to E or F is color 1 data generated by the HCU, and color 2–6 data from buffer D (supplied from DRAM). Color 1 data is written to EF whenever the HCU's OutputValid flag is set, and color 2–6 data is written during other times from register C.

Buffer $OE_1$ 81 in FIG. 9 is a 32-bit register used to hold a single HCU-generated set of contiguous 32 dots for color 1. While the dots are contiguous on the page, the odd and even dots are printed at different times.

Buffer AB 82 is a double buffered mechanism for delaying odd dot data for color 1 by 2 dotlines. Buffers A and B therefore have identical structures. During the processing of a line of dots, one of the two buffers is read from and then written to. The two buffers are logically swapped after the entire dot line has been processed. A single bit flag ABSense determines which of the two buffers are read from and written to.

The HCU provides 32-bits of color 1 data whenever the output valid control flag is set, which is every 32 cycles after the first flag has been sent for the line. The 32 bits define a contiguous set of 32 dots for a single dot line—16 even dots (bits 0, 2, 4 etc.), and 16 odd dots (bits 1, 3, 5 etc.). The output valid control flag is used as a WriteEnable control for the $OE_1$ register 81. We process the HCU data every 2 OutputValid signals. The 16 even bits of HCU color 1 data are combined with the 16 even bits of register $OE_1$ to make 32-bits of even color 1 data. Similarly, the 16 odd bits of HCU color 1 data are combined with the 16 odd bits of register $OE_1$ to make 32-bits of odd color 1 data. Upon receipt of the first OutputValid signal of the group of two, we read buffer AB to transfer the odd data to color 1, 73 in FIG. 11 within buffer EF. Upon receipt of the second OutputValid signal of the group of two, we write the 32-bits of odd data to the same location in buffer AB that we read from previously, and we write the 32-bits of even data to color 1 within buffer EF.

The HCU provides 32 bits of data per color plane whenever the OutputValid control flag is set. This occurs every 32 cycles except during certain startup times. The 32 bits define a contiguous set of 32 dots for a single dot line—16 even dots (bits 0, 2, 4 etc.), and 16 odd dots (bits 1, 3, 5 etc.).

While buffer $OE_1$ (83 in FIG. 10) is used to store a single 32-bit value for color 1, buffers $OE_2$ to $OE_6$ are used to store a single 32-bit value for colors 2 to 6 respectively. Just as the data for color 1 is split into 32-bits representing color 1 odd dots and 32-bits representing color 1 even dots every 64 cycles (once every two OutputValid flags), the remaining color planes are also split into even and odd dots.

However, instead of being written directly to buffer EF, the dot data is delayed by a number of lines, and is written out to DRAM via buffer CD (84 in FIG. 9). While the dots for a given line are written to DRAM, the dots for a previous line are read from DRAM and written to buffer EF (71,72). This process must be done interleaved with the process writing color 1 to buffer EF.

Every time an OutputValid flag is received from the HCU on line 85 in FIG. 10, the 32-bits of color N data are written to buffer $OE_N$ (83). Every second OutputValid flag, the combined 64-bit value is written to color buffer N (86). This happens in parallel for all color planes 2–6. Color Buffer N (86) contains 40 sets of 64-bits (320 bytes) to enable the dots for two complete segments to be stored. This allows a complete segment generation time (20×64=1280 cycles) for the previous segment's data (both odd and even dots) to be written out to DRAM. Address generation for writing is straightforward. The ColorNWriteEnable signal on line 87 is given every second OutputValid flag. The address starts at 0, and increments every second OutputValid flag until 39. Instead of advancing to 40, the address is reset to 0, thus providing the double-buffering scheme. This works so long as the reading does not occur during the OutputValid flag, and that the previous segment's data can be written to DRAM in the time it takes to generate a single segment's data. The process is shown in the following pseudocode:

```
adr = 0
firstEncountered = 0
While (NOT AdvanceLine)
    If (HCU_OutputValid) AND (firstEncountered))
        ColorNWriteEnable = TRUE
        ColorNAdr = adr
        If (adr == 39)
            adr = 0
        Else
            adr = adr + 1
        EndIf
    Else
        ColorNWriteEnable = FALSE
    EndIf
    If (HCU_OutputValid)
        firstEncountered = NOT(firstEncountered)
    EndIf
EndWhile
```

Address generation for reading is trickier, since it is tied to the timing for DRAM access (both reading and writing), buffer EF access, and therefore color 1 generation. It is more fully explained below.

Address generation for buffers C, D, E, F, and colorN are all tied to the timing of DRAM access, and must not interfere with color 1 processing with regards to buffers E and F. The basic principle is that the data for a single segment of color N (either odd or even dots) is transferred from the DRAM to buffer EF via buffer CD. Once the data has been read from DRAM those dots are replaced based on the values in ColorBufferN. This is done for each of the colors in odd and even dots. After a complete segment's worth of dots has accumulated (20 sets of 64 cycles), then the process begins again. Once the data for all segments in a given printline has been transferred from and to DRAM, the current address for that color's DRAM buffer is advanced so that it will be the appropriate number of lines until the particular data for the color's line is read back from DRAM. In this respect then, the DRAM acts as a form of FIFO. Consequently color N (either odd or even) is read from DRAM into buffer D while copying color N (same odd/even sense) to buffer C. The copying of data to buffer C takes 20 or 21 cycles depending on whether the OutputValid flag occurs during the 20 transfers. Once both tasks have finished (typically the DRAM access will be the slower task), the second part of the process begins. The data in buffer C is written to DRAM (the same locations as were just read) and the data in buffer D is copied to buffer EF (again, no color N data is transferred to buffer EF while the OutputValid flag is set since color 1 data is being transferred). When both tasks have finished the same process occurs for the other sense of color N (either odd or even), and then for each of the remaining colors. The entire double process happens 10 times. The addresses for each of the current lines in DRAM are then updated for the next line's processing to begin.

In terms of bandwidth, the DRAM access for dot data buffers consumes the great majority of all DRAM access from PEC. For each print line we read an entire dot line for colors 2–6, and write an entire dot line for colors 2–6. For th maximum of 15 segments this equates to 2×5×15×1280 bits=192,000 bits (24,000 bytes) per print line. For the fastest printing system (30,000 lines per second) this equates to 687 MB/sec. For 1 page per second printing the bandwidth required is 312 MB/sec. Since the bandwidth is so high, the addresses of the various half-lines for each color in DRAM should be optimized for the memory type being used. In an RDRAM memory system for example, the very first half-line buffer is aligned for each color to a 1 KByte boundary to maximize page-hits on DRAM access. As the various segments are processed it is necessary to ensure that if the start of the next segment was going to be aligned at byte 960 within the 1 KByte page, then the 640-bit access would span 2 pages. Therefore the variable DRAMMaxVal is used to check for this case, and if it occurs, the address is rounded up for the next half-line buffer to be page-aligned. Consequently the only waste is 64 bytes per 13 segments, but have the advantage of the 640-bit access completely within a single page.

The address generation process can be considered as NumSegments worth of 10 sets of: 20×32-bit reads followed by 20×32-bit writes, and it can be seen in the following pseudocode:

The print head interface (PHI) is the means by which the processor loads the print head with the dots to be printed, and controls the actual dot printing process. It takes input from the LLFU and outputs data to the print head itself. The PHI will be capable of dealing with a variety of print head lengths and formats. The internal structure of the PHI should allow for a maximum of 6 colors, 8 segments per transfer, and a maximum of 2 segment groups. This should be sufficient for a 15 segment (8.5 inch) printer capable of printing A4/Letter at full bleed.

A copending application titled Print Head Driven by Multiple Engine/Controllers to the inventors Paul Lapstum and Simon Walmsley describes print engine/controller adaptations useful to interface multiple chips to a print head.

```
EFStartAdr = 0
Do NumSegments times:
    For CurrColor = 0 to MaxHalfColors
        DRAMStartAddress = ColorCurrAdr[CurrColor]
        While reading 640 bits from DRAMStartAddress into D(>= 20 cycles)
            ColorNAdr = 0
            While (ColorNAdr != 20)
              If (NOT HCU_OutputValid)
                 Transfer ColorNBuffer[ColorNAdr|CurrColor_bit0] to C[ColorNAdr]
                 ColorNAdr = ColorNAdr + 1
              EndIf
            EndWhile
        EndWhile - wait until read has finished
        While writing 640 bits from C into DRAMStartAddress (>=20 cycles)
            ColorNAdr = 0
            EFAdr = EFStartAdr
            While (ColorNAdr != 20)
              If (NOT HCU_OutputValid)
                 Transfer D[ColorNAdr] to EF[CurrColor|EFAdr]
                 If ((ColorNAdr == 19) AND (CurrColor == NumHalfColors))
                    EFStartAdr = EFAdr + 1
                 Else
                    EFAdr = EFAdr + 1
                 EndIf
                 ColorNAdr = ColorNAdr + 1
              EndIf
            EndWhile
        EndWhile - wait until write has finished
        If (DRAMStartAddress == DRAMMaxVal)
            ColorCurrAdr[currColor] = round up DRAMStartAddress to next 1KByte page
        Else
            ColorCurrAdr[currColor] = DRAMStartAddress + 640 bits
        EndIf
        If (Segment == maxSegments)
            If (ColorCurrRow[CurrColor] == ColorMaxRow[CurrColor])
               ColorCurrRow[currColor] = ColorStartRow[currColor]
               ColorCurrAdr[currColor] = ColorStartAdr[currColor]
            Else
               ColorStartRow[currColor] = ColorCurrRow[currColor] + 1
            EndIf
        EndIf
    EndFor
EndDo
```

Wait Until Next Advance Signal from PHI

Note that the MaxHalfColors register is one less than the number of colors in terms of odd and even colors treated separately, but not including color 1. For example, in terms of a standard 6 color printing system there are 10 (colors 2–6 in odd and even), and so MaxHalfColors should be set to 9.

The LLFU requires 2NumSegments cycles to prepare the first 180 bits of data for the PHI. Consequently the print head should be started and the first LineSync pulse must occur this period of time after the LLFU has started. This allows the initial Transfer value to be valid and the next 90-bit value to be ready to be loaded into the Transfer register.

Throughout the specification the aim has been to describe the preferred embodiments of the invention without limiting the invention to any one embodiment or specific collection of features. Persons skilled in the art may realize variations from the specific embodiments that will nonetheless fall within the scope of the invention.

The invention claimed is:

1. A printer comprising:
 a pagewidth inkjet printhead for printing bi-level dots of ink onto print media at a resolution of 800 to 1600 dpi; and at least one controller for controlling the pagewidth inkjet printhead, the, or each, controller comprising:
- a receiver for receiving compressed page data to be printed by the printhead;
- a first decoder configured to decode any compressed continuous tone image planes in the received compressed page data at a resolution of up to 320 ppi in each plane;
- a second decoder configured to decode any compressed bi-level image planes in the received compressed page data at a resolution of 320 to 1600 dpi in each plane;
- a half-toner/compositor for creating a composite image by halftoning the continuous tone image planes decoded by the first decoder and compositing the bi-level image planes decoded by the second decoder over the halftoned continuous tone image planes; and
- a printhead driver arranged to output the composite image to the printhead.

2. A printer as claimed in claim 1, wherein the first decoder is a JPEG decoder.

3. A printer as claimed in claim 1, wherein the first decoder outputs separate color planes of the decoded continuous tone image planes to separate buffers of the half-toner/compositor.

4. A printer as claimed in claim 1, wherein page data in each continuous tone image plane is scaled in the half-toner/compositor.

5. A printer as claimed in claim 1, wherein the second decoder is a Group 4 facsimile decoder.

6. A printer as claimed in claim 1, wherein the second decoder outputs the decoded bi-level image planes to respective buffers of the half-toner/compositor.

7. A printer as claimed in claim 1, wherein page data in each bi-level image plane is scaled in the half-toner/compositor.

8. A printer as claimed in claim 1, wherein the at least one controller further comprises an infrared tag encoder arranged to produce an infrared image plane to place infrared ink printed tags into a printed page.

9. A printer as claimed in claim 1, wherein the half-toner/compositor incorporates a dot merger unit controlled by a color mask to effect integration of the image planes with what inks are provided in the printhead.

10. A printer as claimed in claim 1, wherein the half-toner/compositor incorporates a margin unit arranged to apply margin data to the respective image planes during the compositing.

* * * * *